April 26, 1960   J. C. CHUPA   2,934,344
VALVE FOR INFLATABLE OBJECT
Filed May 12, 1954   2 Sheets-Sheet 1

INVENTOR.
JOHN C. CHUPA
BY
ATTORNEYS

April 26, 1960  J. C. CHUPA  2,934,344
VALVE FOR INFLATABLE OBJECT
Filed May 12, 1954  2 Sheets-Sheet 2

*INVENTOR*
JOHN C. CHUPA
BY Ely, Duyer Hamilton

ATTORNEYS

United States Patent Office 2,934,344
Patented Apr. 26, 1960

2,934,344

VALVE FOR INFLATABLE OBJECT

John C. Chupa, Sandusky, Ohio, assignor to The Barr Rubber Products Company, Sandusky, Ohio, a corporation of Ohio Application May 12, 1954, Serial No. 429,162

5 Claims. (Cl. 273—58)

The present invention relates to valves to be employed in inflatable balls or similar inflatable objects which are designed to be inflated through use of an inflating needle.

Heretofore self-sealing valves have been employed in objects designed to be inflated with an inflating needle. Such prior valve structure consists of a rubber or elastic plug constrained within a housing on the wall of an inflatable object. When the object is to be inflated, the plug is punctured by an inflation needle. When inflation is completed, the needle is withdrawn from the plug and the resiliency of the plug, together with the radial compression of the plug caused by the constraining effect of the plug housing, causes the puncture to be closed off. A disadvantage of such valves is that the valve plugs soon lose their life and do not completely seal the valve. Furthermore, such valves are frequently difficult to use in that the compressed plug is very difficult to puncture manually, even when a sharp needle is employed.

In an effort to avoid these difficulties, other valves have been provided employing a liquid seal-off means. Such valves are costly and elaborate in structure.

The present invention provides a valve which is rugged and durable, which is inexpensive to manufacture and which is simple and fool-proof in operation. The valve has an unusually long service life and is particularly easy to use because of the provision of a lubricant-sealant valve material.

The invention may also involve the pre-stressing of the sealing closure or plug in a manner which will make the valve inherently self-sealing, all as disclosed below.

These and other objects and advantages of the invention will be more clearly understood from a reading of the following specification and the accompanying drawings in which:

Figures 5A and 5B are schematic views illustrating the way in which an element in Figure 5 may be made.

Figure 1:
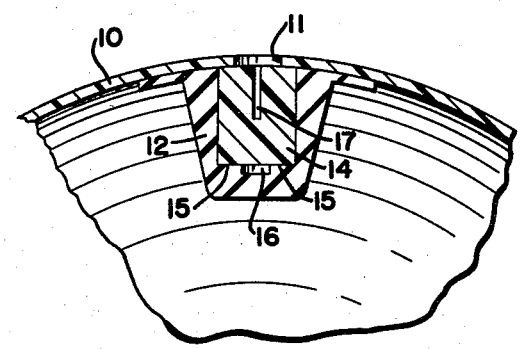
Figure 1 is a cross-sectional view of a valve structure embodying the invention.

In Figure 1 a housing 12 is mounted on the inner side of the wall 10 of an inflatable article, the flange of the housing 12 being suitably welded or fixed to the wall 10. A plug 14 is retained within the housing 12 and seats against the lower shoulders 15. The shoulders 15 define a central chamber or sump 16. A needle guide passage 17 may extend at least partially down through the plug 12. The opening 11 in the wall 10 is preferably aligned with the passage 17. The resiliency of the various members is such that the plug may be forced from the outside through the orifice 11 and into position within the housing 12 where it is thereafter normally retained by the overlapping relationship of the wall 10.

According to the present invention, the plug 14 comprises a synthetic plastisol consisting essentially of a resin and a non-volatile plasticizer therefor. Plasticizer which tends to bleed or migrate through the plug gathers at the outside surfaces of the plug, in the passage 17 and in the sump 16.

When the air envelope comprising the wall 10 is to be inflated, an inflating needle is inserted through the opening 11 and passage 17 and is caused to penetrate all the way through the bottom of the valve housing, the lubrication afforded by the plasticizer facilitating such penetration. As the needle is withdrawn after inflation, the path of puncture in the plug 14 is sealed off by liquid plasticizer migrating thereto. The sump 16 aids in assuring a plentiful distribution of plasticizer along the path of puncture. Plasticizer in the sump 16 tends to follows the withdrawing needle up into the path of puncture. The plasticizer not only functions as a viscous liquid in providing a seal, it also apparently effects at least partial welding of the plastisol across the path of puncture.

An exemplary formulation for a plastisol of which the plug 14 may be formed is set forth below:

| | Parts by weight |
|---|---|
| High molecular weight polyvinylchloride in form of a fine white powder, specific gravity approximately 1.4 | 40 |
| Polyvinylchloride acetate copolymer, vinyl chloride 96%+, less than 4% vinyl acetate | 20 |
| Triethylene glycol (di-2-ethyl hexoate) | 20 |
| Dioctyl phthalate | 20 |
| Cadmium naphthenate dissolved in plasticizer-type carrier, approximately 1:1 (stabilizer) | 2 |
| Titanox (color) | 3 |

Another formulation characterized by an excess of plasticizer is set forth below. This formula may be preferred over the first given above because in the present formulation there is not only an excess of plasticizer, but the characteristics of this formulation are such that plasticizer migration is less inhibited than in the prior formulation.

| | Parts by weight |
|---|---|
| High molecular weight polyvinyl chloride in form of a fine white powder, specific gravity approximately 1.4 | 40 |
| Dioctyl phthalate | 15 |
| Unsaturated petroleum hydrocarbon secondary plasticizer ("Dutrex 25," Shell Oil Company) | 45 |
| Diglycidyl ether of diphenylol propane (stabilizer) | 1 |
| Calcium carbonate filler | 5 |

It is to be understood that even those formulations in connection with which there is reduced plasticizer migration may be employed in the present invention particularly where the pressure within the inflated air envelope is relatively low, even limited migration providing excellent lubrication of the needle as it is being inserted and providing a seal sufficient to retain air within the envelope after the needle is withdrawn. A formulation of this type is given below. This merely varies the proportion of ingredients given in the first formulation above:

| | Parts by weight |
|---|---|
| High molecular weight polyvinylchloride in form of a fine white powder, specific gravity approximately 1.4 | 60 |
| Polyvinylchloride acetate copolymer, vinyl chloride 96% +, less than 4% vinyl acetate | 13⅓ |
| Triethylene glycol (di-2-ethyl hexoate) | 13⅓ |
| Dioctyl phthalate | 13⅓ |
| Cadmium naphthenate dissolved in plasticizer type carrier, approximately 1:1 (stabilizer) | 2 |
| Titanox (color) | 3 |

It will be apparent to those familiar with the art that the above formulations may be molded or cast into the desired plug shape by heating the mix, in a mold or form of appropriate shape, to a temperature of about 165° C., thus causing the mix to jell and fuse.

Figure 2:
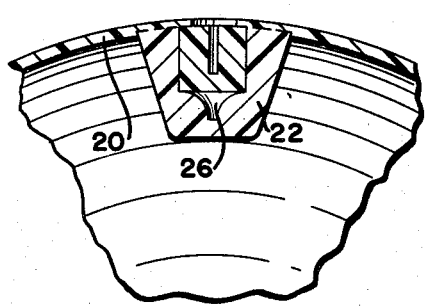
Figure 2 is a cross-sectional view of another valve structure embodying the invention.

Figure 2 illustrates a valve similar to that illustrated in Figure 1 except that the shape of the well or sump 26 is different than that of the sump 16 and the housing 22 is welded or merged with the wall 20. Such a structure may be preferred when the envelope wall and valve housing, as well as the plug, comprise a plastisol. It will be understood that the wall 10 and housing 12 in Figure 1 may be fabricated from rubber.

Figure 3:
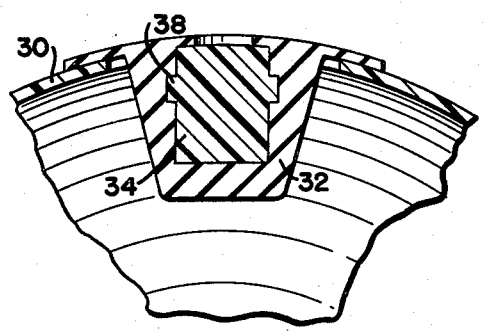
Figure 3 is a cross-sectional view of a third valve structure embodying the invention.

In the valve structure shown in Figure 3, an air-envelope wall 30 is provided with a valve housing 32 having outer flanges suitably welded or adhered to the outside of the wall 30. The plastisol valve plug 34 is provided with a ridge 38 which keys into a corresponding groove in the valve housing to aid in retention of the valve plug in the valve housing. In this example no sump or drain is provided similar to the sumps 16 and 26. While there is therefore no great excess of plasticizer at the point where the inflating needle is drawn back into the plug, normal plasticizer bleed provides sufficient sealing, particularly at lower pressures. In this example no needle guide passage is provided in the plug.

Figure 4:
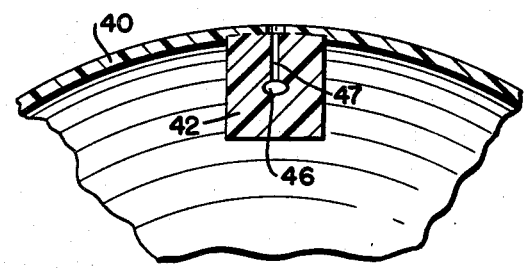
Figure 4 is a cross-sectional view of a fourth valve structure embodying the invention.

In Figure 4 an air-envelope wall 40 has a plastisol valve plug or body 42 welded or adhered thereto or, as indicated in the drawing, partially merged therewith, such partial merging being practical when the wall 40 also comprises a plastisol. The valve plug or body may have formed therein a needle guide passage 47 and a central chamber or sump 46. No outer plug-constraining housing equivalent to the housings 12, 22 and 32 is provided in this example. In the examples shown in Figures 1, 2, and 3, the outer housings may function to exert a degree of radial compression upon the plugs contained therein, such plugs having a slightly greater diameter than the housing bores in which they are contained. While such compression greatly aids in closing the line of needle puncture and obtaining satisfactory sealing, it may not be essential in all applications, particularly where very low pressures of the contained air or other gas are contemplated. In the example of Figure 4, a needle may be inserted through the passage 47 and caused to penetrate the bottom of the plug or body 42. As the needle is removed following inflation, plasticizer within the chamber 46 tends to seep into the path of puncture, effecting resealing.

Figure 5:
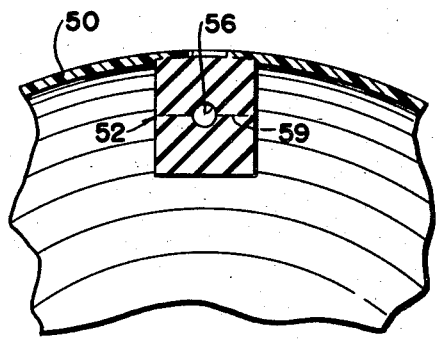
Figure 5 is a cross-sectional view of a fifth valve structure embodying the invention.

The provision of a confining chamber which exerts radial compression on a valve plug is frequently troublesome because the plug tends to be expressed from its confining housing and may pop out of the housing when the inflated article is bounced or subjected to other sudden impact. At the same time, such confinement has been thought necessary in order to provide a good seal, particularly at higher pressures. In the example shown in Figure 5, radial compression is provided, but the tendency to pop out is eliminated. In Figure 5 an air-envelope wall 50 has a valve plug or body 52 welded or adhered thereto or, as indicated in the drawing, partially merged therewith, such partial merging being practical when both the wall and body comprise a plastisol. The valve body shown in Figure 5 is formed by casting or otherwise forming a pair of dished body halves as shown in Figure 5A. The body halves are then welded or otherwise adhered along line 59 while being held together in flattened shape by suitable constraining means as shown in Figure 5B. The halves may be formed to contain a chamber 56 as shown. It will be apparent that the plug or body 52 in Figure 5, formed as shown in Figures 5A and 5B, will be under considerable radial compression at its central portions and closure of any punctures therethrough will be promoted by such radial compression. If the plug or body 52 is rubber, improved sealing may be obtained by providing one or several drops of glycerine within the chamber 56, the glycerine being deposited before the halves of the plug or body 52 are joined. The radial compression of the plug or body 52 together with the sealing and lubricating effect of the glycerine works very well, the compressed portion of the body also acting as a wiper of the needle as it is withdrawn, preventing rapid exhaustion of the glycerine upon repeated inflations.

Figure 6:
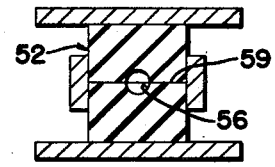
Figure 6 is a cross-sectional view of a sixth valve structure embodying the invention.
Figure 6:
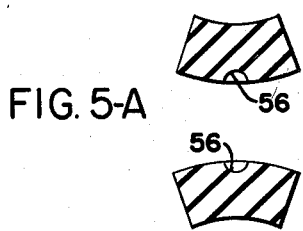
Figure 6:
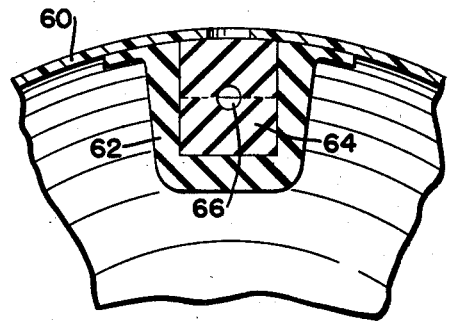

In the example shown in Figure 6, a housing 62 is fixed to an air-envelope wall 60. Inserted in the air-envelope wall 62 is a plug 64 which may be made from rubber or plastisol halves formed in a manner similar to that illustrated in Figures 5A and 5B. The plug 64 may or may not contain a chamber 66 with glycerine placed therein in order to maintain the sealing characteristics of the plug while providing lubrication for an inflating needle. Even if the plug is made from rubber and is not provided with such a chamber, it will be found to be definitely superior to valves of the prior art since the binding effect on an inflating needle is minimized by the concentration of radial compression in only a portion of the total depth of the plug. It should be noted that compressing engagement between the housing 62 and the plug 64 may be eliminated so that the plug does not have a tendency to pop out of the housing, a common difficulty of prior valves of similar type, as mentioned above. Because there is no such compressing engagement and in order to assure sealing around the plug as well as through the plug, it may be preferred to bond the plug to the housing 62 by an adhesive coating or otherwise.

The pre-stressed plugs or housings shown in Figures 5 and 6 may be pre-stressed in other ways. For example, the halves shown schematically in Figure 5A may be arranged with their concave surfaces facing each other, rather than having their convex surfaces facing each other as shown. Upon being joined as shown in Figure 5B, the strata of greatest radial compression will then be near the top and bottom of the completed plug, rather than at or near the central portion thereof as is the case with the plug illustrated in the drawings.

Many variations and alternatives to the specific examples illustrated may suggest themselves. The scope of the invention is not to be limited to specific details of the several illustrated examples but is to be defined by the scope of the following claims.

What is claimed is:

1. An air valve for use with an inflating needle comprising a housing having a bore, a plug received within said bore with one end outwardly disposed to receive an inflating needle, at least one stratum of said plug perpendicular to the direction of insertion of the inflating needle being under radial compression whereby punctures through said stratum formed by a needle will tend to be squeezed off upon withdrawal of the needle, said plug consisting essentially of a fused resin and nonvolatile plasticizer therefor which is subject to migration in the resin to both lubricate a penetrating needle and promote welding across the squeezed-off line of puncture following needle removal.

2. An air valve for an inflatable article which is inflated with an inflating needle comprising a plug having an outer face supported on the wall of the inflatable article and an inner face disposed toward the interior of said article, said plug consisting essentially of a fused resin and non-volatile plasticizer therefor, the plasticizer migrating in part toward surfaces of the plug whereby an inflating needle penetrating from one to the other of said faces is lubricated by plasticizer migrating to the surface of the line of puncture and the line of puncture is sealed by migrated plasticizer upon withdrawal of the needle.

3. An air valve for use with an inflating needle comprising a housing having a bore, a plug received within said bore with one end outwardly disposed to receive an inflating needle, at least one stratum of said plug perpendicular to the direction of insertion of the inflating needle being predominantly under radial compression whereby punctures through said stratum formed by a needle will tend to be squeezed off upon withdrawal of the needle, said plug consisting essentially of a fused resin and non-volatile plasticizer therefor which is subject to migration in the resin to both lubricate a penetrating needle and promote welding across the squeezed-off line of puncture following needle removal, a reservoir chamber within said plug to store excess plasticizer in free liquid form, said chamber being located to be penetrated by an inflating needle.

4. An air valve for use with an inflating needle comprising a housing having a bore, a plug received within said bore with one end outwardly disposed to receive an inflating needle, at least one stratum of said plug perpendicular to the direction of insertion of the inflating needle being predominantly under radial compression whereby punctures through said stratum formed by a needle will tend to be squeezed off upon withdrawal of the needle, said plug consisting essentially of a fused resin and a non-volatile plasticizer therefor which is subject to migration in the resin to both lubricate a penetrating needle and promote welding across the squeezed-off line of puncture following needle removal, a reservoir chamber between said plug and said housing to store excess plasticizer in liquid form, said chamber being located to be penetrated by an inflating needle.

5. An air valve for an inflatable article which is inflated with an inflating needle comprising a plug having an outer face supported on the wall of the inflatable article and an inner face disposed toward the interior of said article, said plug consisting essentially of a fused resin and non-volatile plasticizer therefor, the plasticizer migrating in part toward surfaces of the plug whereby an inflating needle penetrating from one to the other of said faces is lubricated by plasticizer migrating to the surface of the line of puncture and the line of puncture is sealed by migrated plasticizer upon withdrawal of the needle, a reservoir chamber within said plug to store excess plasticizer in free liquid form, said chamber being located in the path of penetration of an inflating needle.

References Cited in the file of this patent

UNITED STATES PATENTS

| 1,672,905 | Riddell | June 12, 1928 |
| 2,183,900 | Voit et al. | Dec. 19, 1939 |
| 2,387,433 | Fenton | Oct. 23, 1945 |